(12) United States Patent
Li et al.

(10) Patent No.: US 12,724,338 B2
(45) Date of Patent: Sep. 1, 2026

(54) PROJECTION APPARATUS AND PROJECTING METHOD

(71) Applicant: Qisda Corporation, Taoyuan City (TW)

(72) Inventors: Te-Yuan Li, Taoyuan City (TW); Chih-Wei Cho, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 249 days.

(21) Appl. No.: 18/642,806

(22) Filed: Apr. 22, 2024

(65) Prior Publication Data

US 2024/0419061 A1 Dec. 19, 2024

(30) Foreign Application Priority Data

Jun. 19, 2023 (CN) ........................ 202310723555.8

(51) Int. Cl.
*G03B 21/14* (2006.01)
*G01S 17/08* (2006.01)
*G03B 21/53* (2006.01)

(52) U.S. Cl.
CPC .............. *G03B 21/53* (2013.01); *G01S 17/08* (2013.01)

(58) Field of Classification Search
CPC ........ G03B 21/53; G01S 17/08; H04N 9/315; H04N 9/317
See application file for complete search history.

(56) References Cited

U.S. PATENT DOCUMENTS

| | | | | |
|---|---|---|---|---|
| 11,689,709 | B2 * | 6/2023 | Valli | H04N 13/344 348/51 |
| 2017/0068153 | A1 * | 3/2017 | Ikeura | H04N 9/3185 |
| 2018/0120560 | A1 * | 5/2018 | Wang | G02B 27/40 |
| 2021/0145536 | A1 * | 5/2021 | Vayser | G02B 27/017 |

* cited by examiner

*Primary Examiner* — Howard D Brown, Jr.
(74) *Attorney, Agent, or Firm* — JCIPRNET

(57) ABSTRACT

A projection apparatus configured to project an image frame onto a projected plane is provided. The projection apparatus includes an image source, a projection lens, a time-of-flight ranging sensor (ToF ranging sensor), and a controller. The image source is configured to emit an image beam. The projection lens is configured to project the image beam onto the projected plane to form the image frame. The ToF ranging sensor is configured to measure a distance from the projected plane. The controller is configured to set a sampling range of the ToF ranging sensor and obtain a plurality sets of distance information of measured points on the projected plane by moving the sampling range of the ToF ranging sensor, and adjust a focal distance of the projection lens according to the sets of distance information through the controller. A projecting method is also provided.

16 Claims, 12 Drawing Sheets

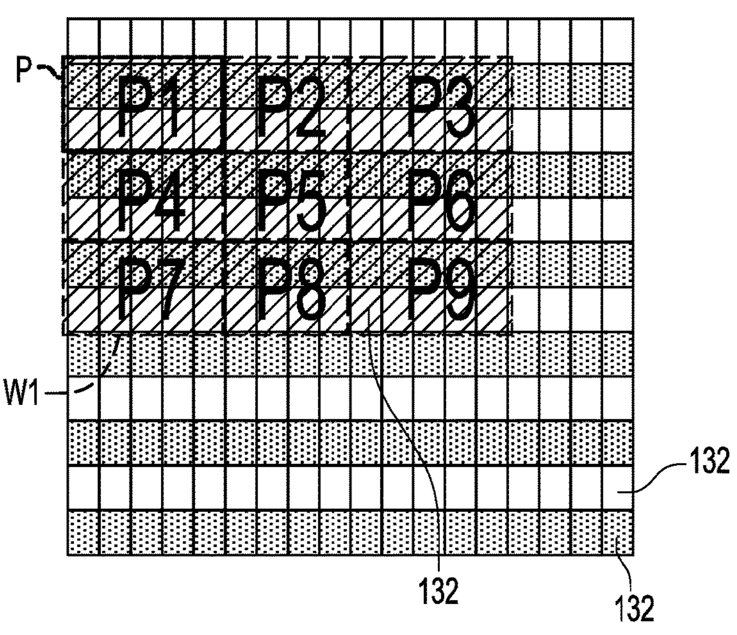
FIG. 2A
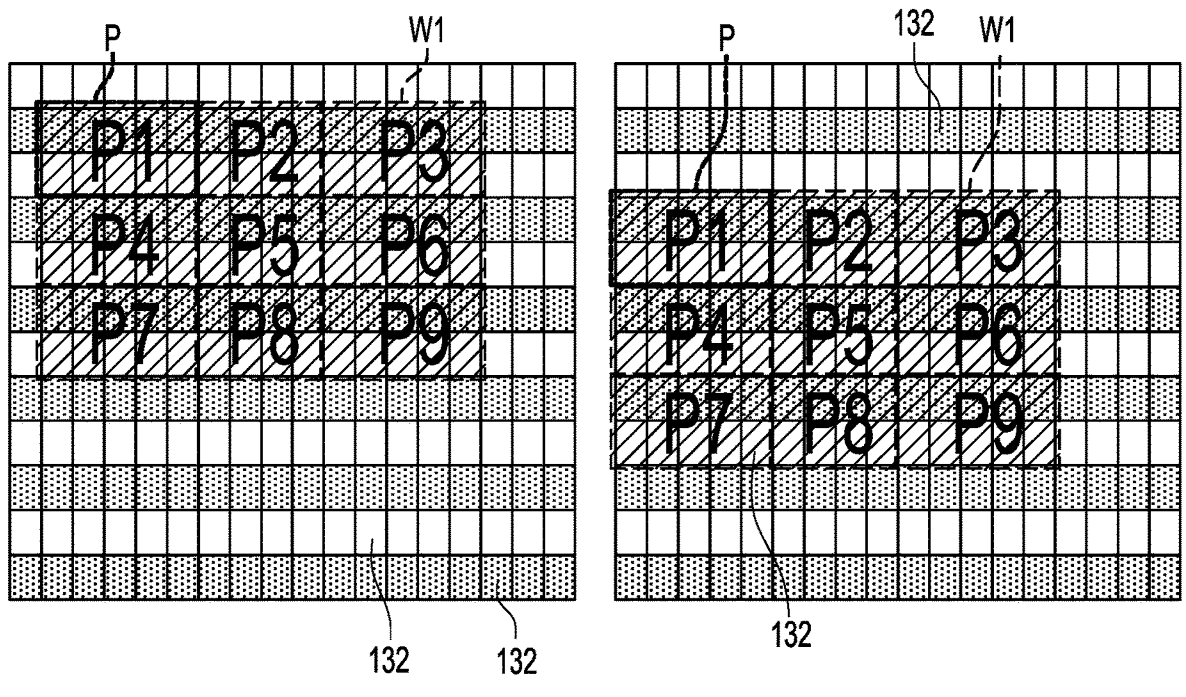
FIG. 2B
FIG. 2C

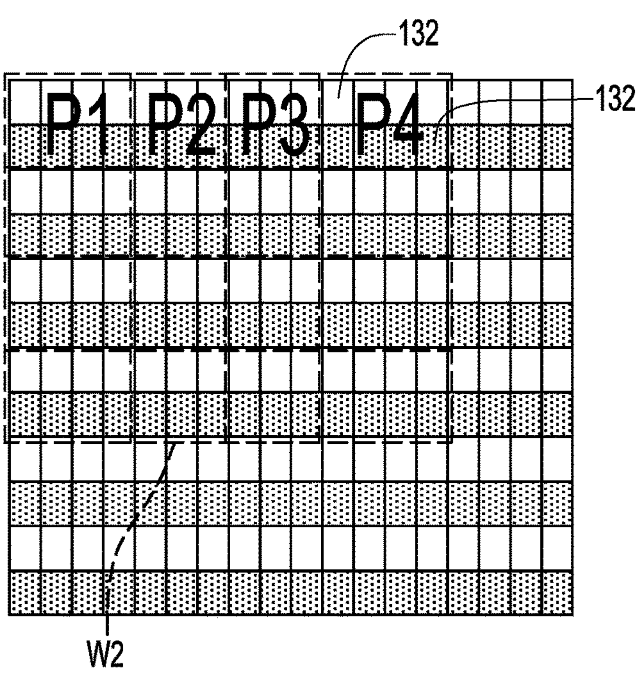
FIG. 3A
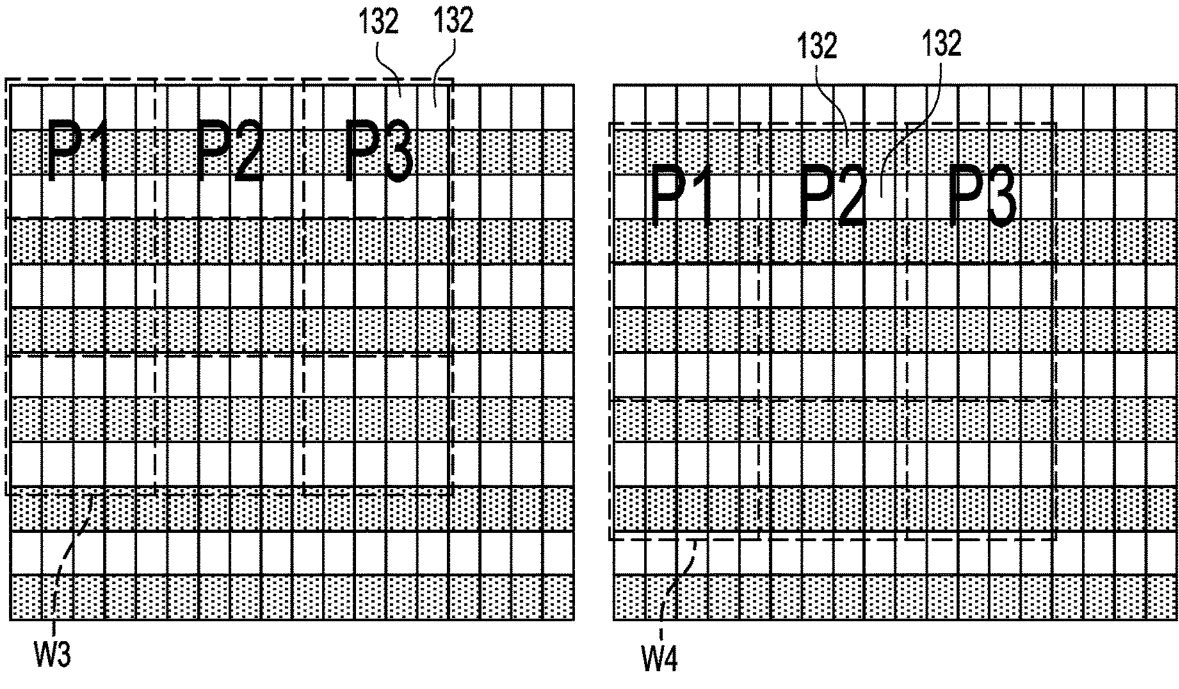
FIG. 3B
FIG. 3C

| | | | | | |
|---|---|---|---|---|---|
| 0.2 | 0.2 | 0.2 | 0.2 | 0.2 | 0.2 |
| 0.1 | 0.1 | 0.1 | 0.1 | 0.1 | 0.1 |
| 0.05 | 0.05 | 0.05 | 0.05 | 0.05 | 0.05 |
| -0.05 | -0.05 | -0.05 | -0.05 | -0.05 | -0.05 |
| -0.1 | -0.1 | -0.1 | -0.1 | -0.1 | -0.1 |
| -0.2 | -0.2 | -0.2 | -0.2 | -0.2 | -0.2 |

FIG. 7A

| | | | | | |
|---|---|---|---|---|---|
| -0.04 | -0.06 | -0.08 | -0.12 | -0.14 | -0.16 |
| -0.04 | 0.04 | 0.02 | -0.02 | -0.04 | -0.16 |
| -0.04 | 0.04 | 0.12 | 0.08 | -0.04 | -0.16 |
| -0.04 | 0.04 | 0.12 | 0.08 | -0.04 | -0.16 |
| -0.04 | 0.04 | 0.02 | -0.02 | -0.04 | -0.16 |
| -0.04 | -0.06 | -0.08 | -0.12 | -0.14 | -0.16 |

FIG. 7B

| | | | | | |
|---|---|---|---|---|---|
| 0.16 | 0.14 | 0.12 | 0.08 | 0.06 | 0.04 |
| 0.06 | 0.14 | 0.12 | 0.08 | 0.06 | -0.06 |
| 0.01 | 0.09 | 0.17 | 0.13 | 0.01 | -0.11 |
| -0.09 | -0.01 | 0.07 | 0.03 | -0.09 | -0.21 |
| -0.14 | -0.06 | -0.08 | -0.12 | -0.14 | -0.26 |
| -0.24 | -0.26 | -0.28 | -0.32 | -0.34 | -0.36 |

FIG. 7C

| | | | | | |
|---|---|---|---|---|---|
| 0.2 | 0.2 | 0.2 | 0.2 | 0.2 | 0.2 |
| 0.1 | 0.1 | 0.1 | 0.1 | 0.1 | 0.1 |
| 0.05 | 0.05 | 0.05 | 0.05 | 0.05 | 0.05 |
| -0.05 | -0.05 | -0.05 | -0.05 | -0.05 | -0.05 |
| -0.1 | -0.5 | -0.1 | -0.1 | -0.1 | -0.1 |
| -0.2 | -0.5 | -0.2 | -0.2 | -0.2 | -0.2 |

| 0.90 | 0.90 | 0.90 | 0.90 | 0.90 | 0.90 |
|---|---|---|---|---|---|
| 1 | 0.90 | 0.90 | 0.90 | 0.90 | 1 |
| 0.95 | 0.95 | 0.85 | 0.85 | 0.95 | 0.95 |
| 0.8 | 0.95 | 0.95 | 0.95 | 0.95 | 0.8 |
| 0.70 | 0.90 | 0.90 | 0.90 | 0.90 | 0.70 |
| 0.50 | 0.50 | 0.50 | 0.50 | 0.50 | 0.50 |

| 7 | 8 | 9 | 9 | 8 | 7 |
|---|---|---|---|---|---|
| 8 | 9 | 9 | 9 | 9 | 8 |
| 9 | 9 | 10 | 10 | 9 | 9 |
| 9 | 9 | 10 | 10 | 9 | 9 |
| 8 | 9 | 9 | 9 | 9 | 8 |
| 7 | 8 | 9 | 9 | 8 | 7 |

BFQT(dist)

*

| 0.90 | 0.90 | 0.90 | 0.90 | 0.90 | 0.90 |
|---|---|---|---|---|---|
| 1 | 0.90 | 0.90 | 0.90 | 0.90 | 1 |
| 0.95 | 0.95 | 0.85 | 0.85 | 0.95 | 0.95 |
| 0.8 | 0.95 | 0.95 | 0.95 | 0.95 | 0.8 |
| 0.70 | 0.90 | 0.90 | 0.90 | 0.90 | 0.70 |
| 0.50 | 0.50 | 0.50 | 0.50 | 0.50 | 0.50 |

DF(dist)

=

| 6.3 | 7.2 | 8.1 | 8.1 | 7.2 | 6.3 |
|---|---|---|---|---|---|
| 8.0 | 8.1 | 8.1 | 8.1 | 8.1 | 8.0 |
| 8.55 | 8.55 | 8.5 | 8.5 | 8.55 | 8.55 |
| 7.2 | 8.55 | 9.5 | 9.5 | 8.55 | 7.2 |
| 5.6 | 8.1 | 8.1 | 8.1 | 8.1 | 5.6 |
| 3.5 | 4.0 | 4.5 | 4.5 | 4.0 | 3.5 |

DFQT(dist)

PROJECTION APPARATUS AND PROJECTING METHOD

CROSS-REFERENCE TO RELATED APPLICATION

This application claims the priority benefit of China application serial no. 202310723555.8, filed on Jun. 19, 2023. The entirety of the above-mentioned patent application is hereby incorporated by reference herein and made a part of this specification.

BACKGROUND

Technical Field

The disclosure relates to a photoelectric apparatus and a photoelectric operation method, and more specifically relates to a projection apparatus and a projecting method.

Description of Related Art

With the advancement of projectors, an increasing amount of automation is being introduced to enable users to operate more quickly and conveniently. Autofocusing is a very important part of these automation systems. Autofocusing allows the projector to be installed in a variety of environments, thereby effectively improving the convenience and versatility of the projector.

Different types of autofocus have different characteristics. For example, camera-based autofocus is relatively low-cost, but slower because it requires analyzing images at different focal distances. On the other hand, time-of-flight (ToF) based autofocus uses simple triangulation to learn the angle of the projected plane and then predicts the focus, so that the focus may be fixed very quickly. However, although the cost of time-of-flight ranging itself is not high, the price becomes more expensive after adding the precise mechanism and focal distance position recording sensor. In addition, there are still some issues with the time-of-flight ranging and fixed focus of general projectors. For example, the focus ignores the overall focus state of the image and only uses the axis center as the main fixed focus area, or the projected plane is non-planar, or small obstacles may cause errors in the prediction of the time-of-flight ranging focus point.

SUMMARY

A projection apparatus that may project a well-focused image frame and has the advantages of low cost and fast autofocusing of the projected image is provided in the disclosure.

A projecting method that may project a well-focused image frame and has the advantages of low cost and fast autofocusing of the projected image is provided in the disclosure.

A projection apparatus configured to project an image frame onto a projected plane is provided in an embodiment of the disclosure. The projection apparatus includes an image source, a projection lens, a time-of-flight (ToF) ranging sensor, and a controller. The image source is configured to emit an image beam, the projection lens is disposed on a light path of the image beam, and is configured to project the image beam onto the projected plane to form the image frame. The ToF ranging sensor is configured to measure a distance from the projected plane. The controller is electrically connected to the ToF ranging sensor and the projection lens. The controller is configured to set a sampling range of the ToF ranging sensor, obtain multiple sets of distance information of measured points on the projected plane by moving the sampling range of the ToF ranging sensor to different positions, and adjust a focal distance of the projection lens according to the sets of distance information through the controller.

A projecting method is provided in an embodiment of the disclosure, including providing a projection apparatus. The projection apparatus includes an image source, a projection lens, and a time-of-flight (ToF) ranging sensor. The image source is configured to emit an image beam, the projection lens is disposed on a light path of the image beam, and is configured to project the image beam onto the projected plane to form the image frame. The ToF ranging sensor is configured to measure a distance from the projected plane. A sampling range of the ToF ranging sensor is set by using a controller. Multiple sets of distance information of measured points on the projected plane are obtained by moving the sampling range of the ToF ranging sensor to different positions by using the controller. A focal distance of the projection lens is adjusted according to the sets of distance information through the controller.

In the projection apparatus and projecting method of the embodiment of the disclosure, since multiple sets of distance information of measured points on the projected plane is obtained by moving the sampling range of the ToF ranging sensor to different positions by using the controller, and a focal distance of the projection lens is adjusted according to the sets of distance information through the controller, the projection apparatus may quickly and accurately autofocus, to project a well-focused image frame.

BRIEF DESCRIPTION OF THE DRAWINGS

FIG. 2A to FIG. 2C respectively illustrate that the sampling range of the ToF ranging sensor in FIG. 1 is moved to three different positions.

FIG. 3A to FIG. 3C illustrate other sampling windows of the ToF ranging sensor in FIG. 1.

FIG. 7A shows a difference matrix of the projection apparatus of FIG. 1.

FIG. 7B shows a focal distance offset matrix of the projection apparatus of FIG. 1.

FIG. 7C shows a matrix obtained by adding the difference matrix of FIG. 7A and the focal distance offset matrix of FIG. 7B.

FIG. 8 shows a difference matrix of the projection apparatus of FIG. 1 with external interference factors.

DETAILED DESCRIPTION OF DISCLOSED EMBODIMENTS

Figure 1:
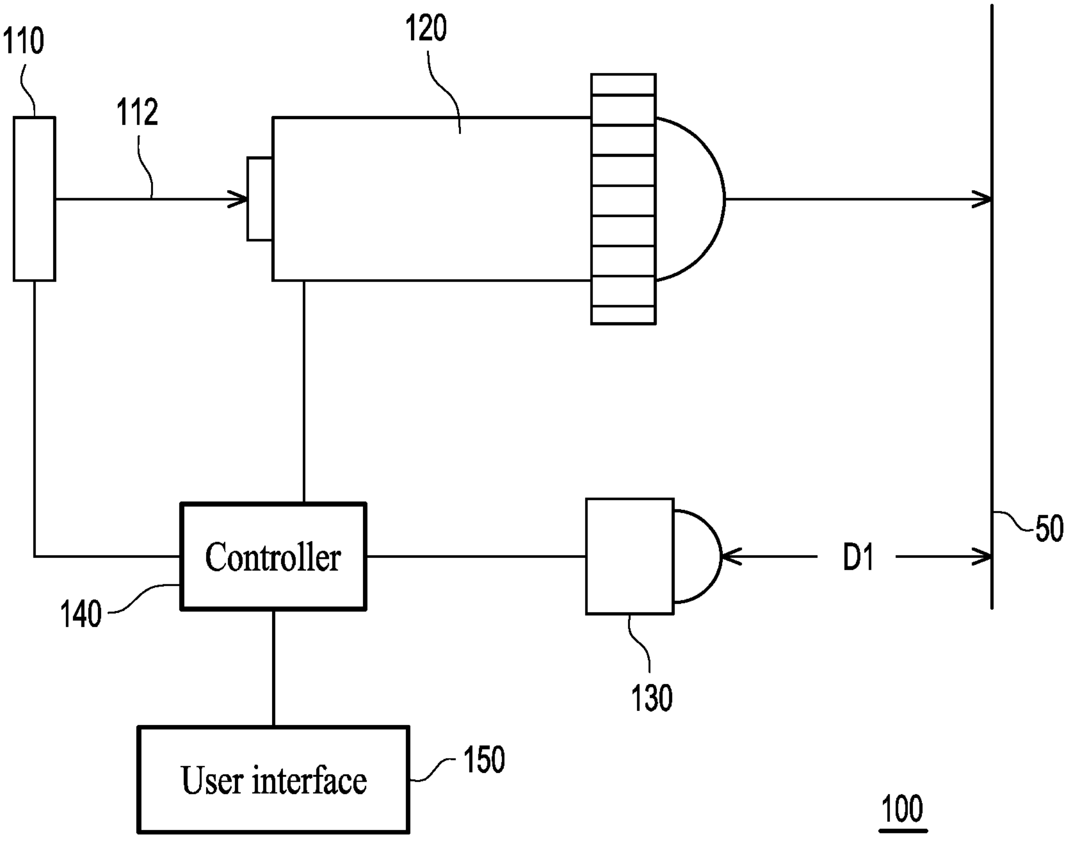
FIG. 1 is a structural schematic diagram of a projection apparatus according to an embodiment of the disclosure.

FIG. 1 is a structural schematic diagram of a projection apparatus according to an embodiment of the disclosure, and FIG. 2A to FIG. 2C respectively illustrate that the sampling range of the time-of-flight (ToF) ranging sensor in FIG. 1 is moved to three different positions. Referring to FIG. 1 and FIG. 2A to FIG. 2C, the projection apparatus 100 of this embodiment is configured to project an image frame to a projected plane 50. In this embodiment, the projected plane 50 is, for example, a screen, a curtain, a wall, a diffusion plate, or any surface that may be projected. The projection apparatus 100 includes an image source 110, a projection lens 120, a ToF ranging sensor 130, and a controller 140. The image source 110 is configured to emit an image beam 112, the projection lens 120 is disposed on a light path of the image beam 112, and is configured to project the image beam 112 onto the projected plane 50 to form the image frame. In this embodiment, the image source 110 may be a digital micro-mirror device (DMD), a liquid-crystal-on-silicon panel (LCOS panel), a transmissive liquid crystal panel, or other appropriate spatial light modulator (SLM), and a light source may be used to provide an illumination beam to illuminate the image source 110, so that the image source 110 converts the illumination beam into an image beam 112.

The ToF ranging sensor 130 is configured to measure a distance D1 of the projected plane 50. The controller 140 is electrically connected to the ToF ranging sensor 130 and the projection lens 120. The controller 140 is configured to set a sampling range of the ToF ranging sensor 130, obtain multiple sets of distance information of measured points on the projected plane 50 by moving the sampling range of the ToF ranging sensor 130 to different positions, and adjust a focal distance of the projection lens 120 according to the sets of distance information through the controller 140.

Specifically, in this embodiment, the ToF ranging sensor includes multiple sensing units 132 arranged in an array. The above-mentioned setting of the sampling range of the ToF ranging sensor 130 is the setting of the sampling window W1 of the ToF ranging sensor 130. For example, the controller 140 is configured to set the sampling window W1 of the sensing units 132, and the sampling window W1 has multiple sampling pixels P (e.g., sampling pixels P1, P2, P3, P4, P5, P6, P7, P8, and P9), each sampling pixel P includes several of the sensing units 132. Each sensing unit 132 is configured to measure a distance value (i.e., the distance between the sensing unit 132 and the projected plane 50), and the distance value of a sampling pixel P is obtained by averaging the distance values measured by the sensing units 132 included therein. This may reduce the sensing error generated by a single sensing unit 132.

FIG. 2A, FIG. 2B and FIG. 2C respectively illustrate schematic diagrams of the sampling window W1 that has moved to different positions. Compared with FIG. 2A, FIG. 2B shows that the sampling window W1 has moved to the right by a distance of one sensing unit 132, and compared with FIG. 2A, FIG. 2C shows that the sampling window W1 has moved downward by a distance of two sensing units 132. That is, the sampling window W1 of FIG. 2A, FIG. 2B, and FIG. 2C includes different groups of sensing units 132, and the sensing units 132 of these groups may be partially the same or completely different (FIG. 2A, FIG. 2B and FIG. 2C is an example that is partially the same).

For example, the center point coordinates of sampling pixels P1 to P9 in FIG. 2A respectively are (3, 2.5), (7.5, 2.5), (12, 2.5), (3, 4.5), (7.5, 4.5), (12, 4.5), (3, 6.5), (7.5, 6.5) and (12, 6.5). In the array of sensing units 132 in FIG. 2A, the center point coordinates of the first four sensing units 132 in the first row (i.e., the horizontal row) starting from the upper left corner are (1, 1), (2, 1), (3, 1) and (4, 1) in sequence, and the center point coordinates of the first four sensing units 132 in the first column from the upper left corner (i.e., the vertical column) are (1, 1), (1, 2), (1, 3) and (1, 4) in sequence, and the center point coordinates of other sensing units 132 may be deduced by analogy. Taking the center point coordinates (3, 2.5), (7.5, 2.5), (12, 2.5) of the sampling pixels P1, P2, and P3 of the sampling window W1 as the point set generated by the base, the center point coordinates of the three groups of sampling pixels P1, P2, and P3 moving laterally (i.e., in the x direction) may be written as the general formulas (3+1*i, 2.5), (7.5+1*i, 2.5), (12+1*i, 2.5), where i=0 to 4, that is, the sampling window W1 may move 5 positions laterally, and the center point coordinates of the three groups of sampling pixels P1, P2, and P3 moving longitudinally (i.e., in the y direction) may be written as the general formulas (3, 2.5+2*j), (7.5, 2.5+2*j), (12, 2.5+2*j), where j=0 to 2, that is, the sampling window W1 may move 3 positions longitudinally. The position of the sampling window W1 in FIG. 2A is the position where i=0 and j=0, the position of the sampling window W1 in FIG. 2B is the position where i=1 and j=0, the position of the sampling window W1 in FIG. 2C is the position where i=0 and j=1, and in this embodiment, the position of the sampling window W1 may be the 15 positions generated by the combination of i=0 to 4 and j=0 to 2.

In this embodiment, 15 sets of distance information of the measured points on the projected plane 50 may be obtained by moving the sampling range (i.e., the sampling window W1) of the ToF ranging sensor 130 to the above 15 different positions, and the controller 140 may adjust the focal distance of the projection lens 120 according to 15 sets of distance information.

In the projection apparatus 100 of this embodiment, multiple sets of distance information of measured points on the projected plane 50 is obtained by moving the sampling range of the ToF ranging sensor 130 to different positions by using the controller 140, and a focal distance of the projection lens 120 is adjusted according to the sets of distance information through the controller 140. In this way, more measured points may be generated on the projected plane 50 and more accurate distance information may be obtained. On the other hand, the ToF ranging sensor 130 may be adopted to achieve quick measurements. Therefore, in this embodiment the projection apparatus 100 may quickly and accurately autofocus, to project a well-focused image frame.

In one embodiment, setting the sampling range of the ToF ranging sensor 130 includes respectively setting various sampling windows W1, W2, W3, and W4 of the ToF ranging sensor 130. The sampling window W1 is shown in FIG. 2A to FIG. 2C, the sampling window W2 is shown in FIG. 3A, the sampling window W3 is shown in FIG. 3B, and the sampling window W4 is shown in FIG. 3C. The controller 140 is configured to obtain multiple sets of distance information by respectively moving various sampling windows W1, W2, W3, and W4 to different positions, the multiple sampling windows W1, W2, W3, and W4 have different sizes or the multiple sampling pixels P of the multiple sampling windows W1, W2, W3, and W4 have different coverage ranges.

For example, taking the center point coordinates (2.5, 1.5), (6, 1.5), (9, 1.5), (12.5, 1.5) of the sampling pixels P1, P2, P3, and P4 of the sampling window W2 as the point set generated by the base, the center point coordinates of the four groups of horizontally moving sampling pixels P1, P2, P3, and P4 may be written as the general formula (2.5+1*i, 1.5), (6+1*i, 1.5), (9+1*i, 1.5), (12.5+1*i, 1.5), where i=0 to 4, that is, the sampling window W2 may move 5 positions laterally, and the center point coordinates of the four groups of sampling pixels P1, P2, P3, and P4 moving longitudinally may be written as the general formula (2.5, 1.5+2*j), (6.5, 1.5+2*j), (9, 1.5+2*j), (12.5, 1.5+2*j), where j=0 to 2, that is, the sampling window W2 may move 3 positions longitudinally. That is, the position of the sampling window W2 may be 15 positions generated by the combination of i=0 to 4 and j=0 to 2.

In addition, taking the center point coordinates (3, 2), (7.5, 2), (12, 2) of the sampling pixels P1, P2, and P3 of the sampling window W3 as the point set generated by the base, the center point coordinates of the three groups of horizontally moving sampling pixels P1, P2, and P3 may be written as the general formula (3+1*i, 2), (7.5+1*i, 2), (12+1*i, 2), where i=0 to 4, that is, the sampling window W3 may move 5 positions laterally, and the center point coordinates of the three groups of sampling pixels P1, P2, and P3 moving longitudinally may be written as the general formula (3, 2+2*j), (7.5, 2+2*j), (12, 2+2*j), where j=0 to 1, that is, the sampling window W3 may move 2 positions longitudinally. That is, the position of the sampling window W3 may be 10 positions generated by the combination of i=0 to 4 and j=0 to 1.

In addition, taking the center point coordinates (3, 3), (7.5, 3), (12, 3) of the sampling pixels P1, P2, and P3 of the sampling window W4 as the point set generated by the base, the center point coordinates of the three groups of horizontally moving sampling pixels P1, P2, and P3 may be written as the general formula (3+1*i, 3), (7.5+1*i, 3), (12+1*i, 3), where i=0 to 4, that is, the sampling window W4 may move 5 positions laterally, and the center point coordinates of the three groups of sampling pixels P1, P2, and P3 moving longitudinally may be written as the general formula (3, 23*j), (7.5, 23*j), (12, 23*j), where j=0 to 1, that is, the sampling window W4 may move 2 positions longitudinally. That is, the position of the sampling window W4 may be 10 positions generated by the combination of i=0 to 4 and j=0 to 1.

When measuring the distance of the projected plane 50, the ToF ranging sensor 130 may first obtain multiple sets of distance information by moving to the above 15 positions with the sampling window W1, then obtain additional sets of distance information by moving to the above 15 positions with the sampling window W2, then obtain additional sets of distance information by moving to the above 10 positions with the sampling window W3, then obtain additional sets of distance information by moving to the above 10 positions with the sampling window W4, and then adjust the focal distance of the projection lens 120 through the controller 140 according to all sets of distance information obtained by the sampling windows W1, W2, W3, and W4. In this way, the distance information obtained may cover more measured points on the projected plane, such the distance information obtained is more sufficient and accurate, so that the projection apparatus 100 of this embodiment may quickly and accurately autofocus, to project a well-focused image frame.

The disclosure does not limit the number of types of sampling windows adopted to 4 (i.e., 4 types of sampling windows W1, W2, W3, and W4). In other embodiments, the number of types of sampling windows may be other numbers, for example, there may be one type of sampling window or multiple types different from four, and the one or multiple types of sampling windows may be moved to different positions to obtain distance information of multiple sets of measured points on the projected plane 50.

Figure 4:
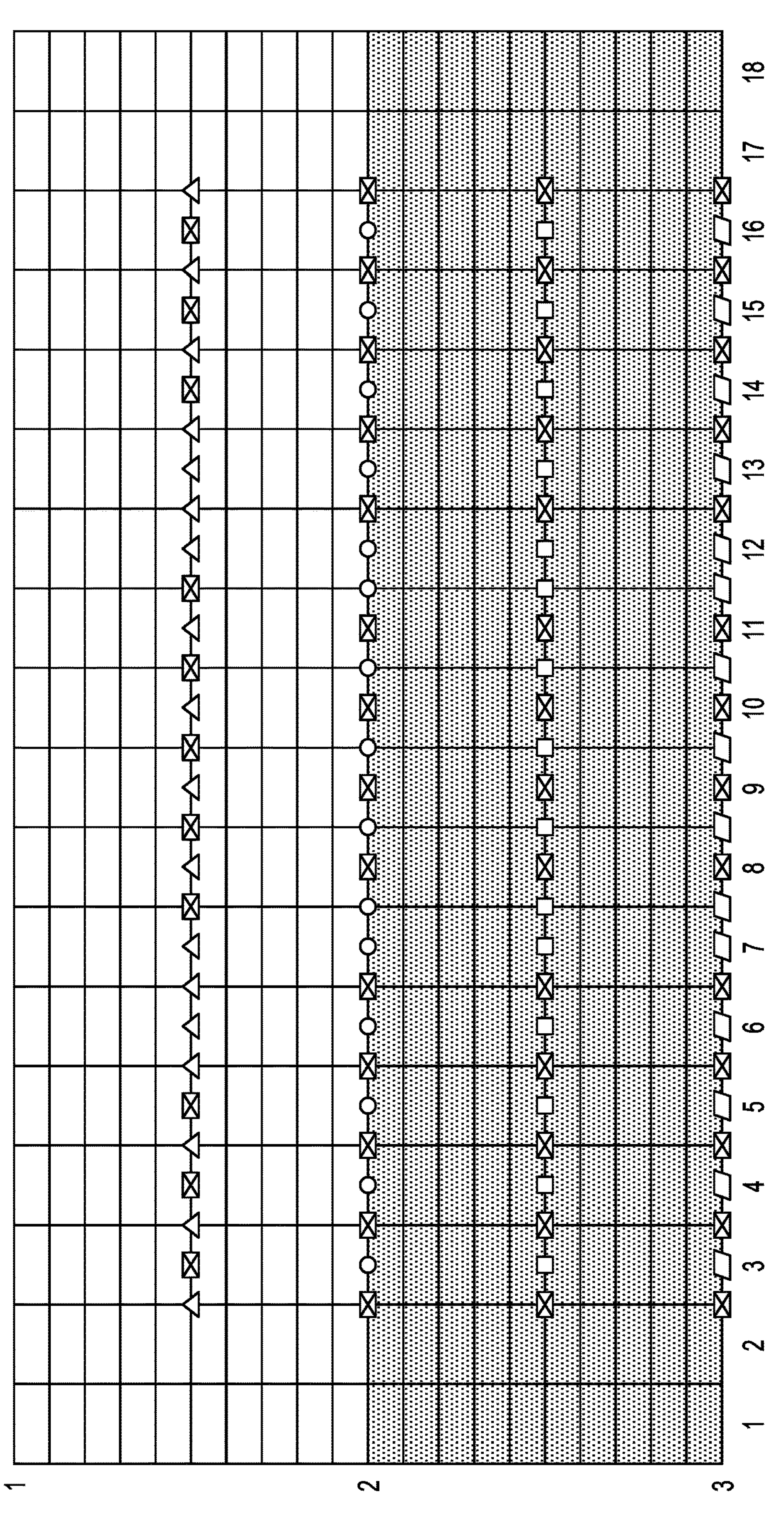
FIG. 4 is a portion of the distance information diagram of the ToF ranging sensor in FIG. 1.

In one embodiment, the controller 140 is configured to interpolate the multiple sets of distance information to improve resolution, and the controller 140 is configured to adjust the focal distance of the projection lens 120 according to the interpolated multiple sets of distance information. For example, after increasing the resolution, the value range of the distance information map is from 2.5 to 16.5 for the x-coordinate and from 1.5 to 11.5 for the y-coordinate, with each unit being 0.5. A portion of the 28×20 distance information map (some of the points are interpolated from neighboring points) is shown in FIG. 4. The square points are generated for the sampling window W1, the triangular points are generated for the sampling window W2, the circular points are generated for the sampling window W3, and the parallelogram points are generated for the sampling window W4. The points marked with a cross in the rectangle correspond to duplicate adjacent points or points interpolated from the two points on the left and right. Each of these points in FIG. 4 corresponds to a distance value, forming the aforementioned distance information.

Figure 5:
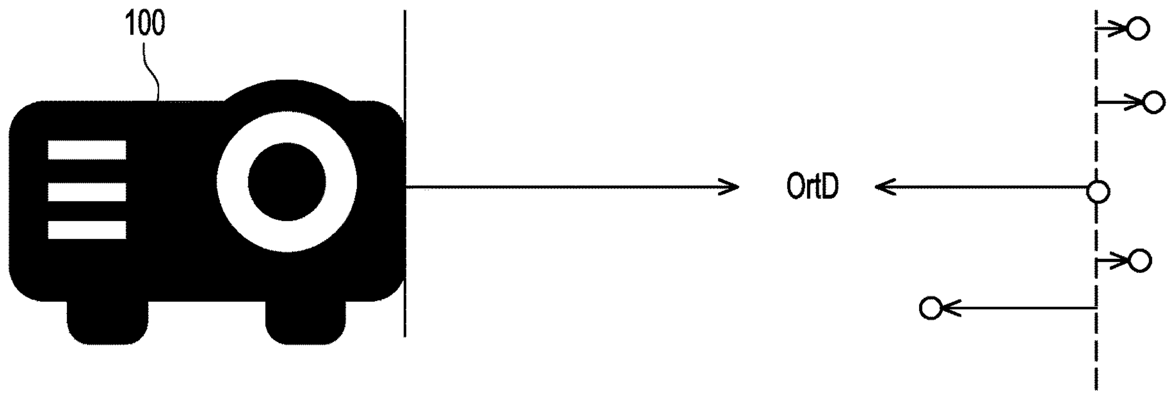
FIG. 5 illustrates the measured points and the average projection distance of the projection apparatus of FIG. 1.

In this embodiment, the controller 140 is configured to calculate a difference matrix between the distance value measured by each sampling pixel P in the sampling range and the distance value measured by the well-focused sampling pixel P in the sampling range. For example, after obtaining the distance information map with improved resolution, the controller 140 may obtain the average projection distance OrtD, as shown in FIG. 5, and the general autofocus based on ToF ranging ends after approximately obtaining the average projection distance of 9 points of the 9-square grid.

Figure 6:
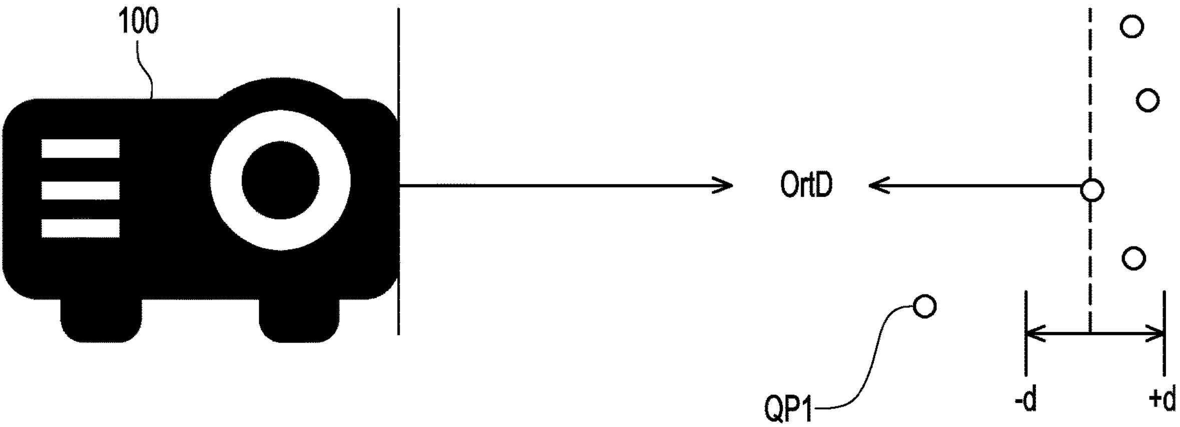
FIG. 6 illustrates a range taken near the average projection distance of the projection apparatus in FIG. 1.

Then, the controller 140 calculates DeD (dist, x, y) by taking an interval within a range of distance (OrtD−d to OrtD+d, the range as shown in FIG. 6) from OrtD, where the d value is a region value within the range where the focus quality may vary, and dist is a variable, which means that this distance is currently used as the focus distance. Here, x, y are the pixel coordinates of the 28×20 distance information map, DeD(dist, x, y) is the distance difference matrix from the point to dist, which is the aforementioned difference matrix, and an example of the difference matrix DeD(dist, x, y) is shown in FIG. 7A for a projected plane 50 with a maximum skew of 0.2 meters. A DeD(OrtD, x, y) distance of 0 means that this is the position with the best focus quality.

The projected plane 50 is not an ideal plane in design, and is roughly a concave or convex shape with a little skew. An average plane is the best for focusing, but the center and periphery respectively have different positive or negative displacements. This phenomenon is the DeD_Shift(dist, x, y) matrix shown in FIG. 7B, which is a focal distance offset matrix known to the projection lens 120 that represents the offset state of the focal distance at each position. Next, in this embodiment, the controller 140 is configured to add the difference matrix DeD(dist, x, y) and the focal distance shift matrix DeD_Shift (dist, x, y) to obtain the matrix as shown in FIG. 7C, which combines the effects of the difference matrix and the focal distance offset matrix.

Figure 9:
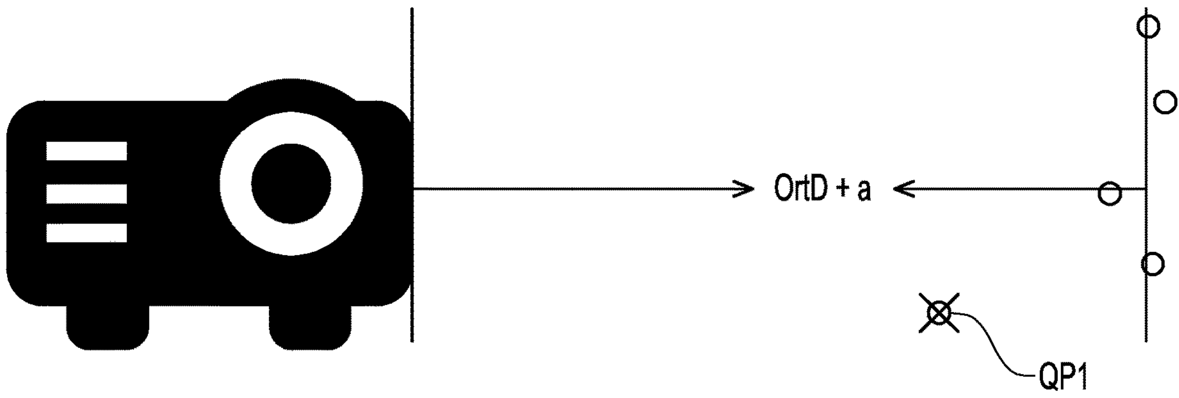
FIG. 9 illustrates the average distance obtained by the projection apparatus of FIG. 1 after removing abnormal information.

In one embodiment, it may be seen from the difference matrix DeD(dist, x, y) in FIG. 8 that there are external interference factors (e.g. obstacles between the projection apparatus 100 and the projected plane 50). For example, the value of region Q1 in the matrix is obviously different from the changing trend of its surrounding values, so the controller 140 may mark the region Q1 without considering it. This is a benefit of the improved resolution of this embodiment, which is quite helpful for improving autofocus. That is, the controller 140 removes the abnormal information (e.g., –0.5 in the region Q1) in the difference matrix DeD(dist, x, y), and calculates the average distance of the projected plane 50. In this embodiment, the abnormal information includes information whose absolute value is too large, or information whose absolute value is too different from surrounding values. In addition, as illustrated in FIG. 6, before removing the information of region Q1 (e.g., removing the information of measured point QP1), the average distance is for example OrtD. After removing the information of region Q1 (e.g., removing the information of measured point QP1), as illustrated in FIG. 9, the controller 140 calculates the average distance of measured points other than the measured point QP1, for example, as OrtD+a. This average distance eliminates the influence of abnormal information caused by obstacles.

In this embodiment, the controller 140 is configured to substitute the result of adding the difference matrix DeD (dist, x, y) and the focal distance shift matrix DeD_Shift (dist, x, y) into a focus sharpness equation DeF to obtain a sharpness matrix DF(dist, x, y). The sharpness equation DeF may be obtained using discrete cosine transform (DCT), fast Fourier transform (FFT) and other methods, and then quantized to obtain an equation for online use. The result is the equation curve shown in FIG. 10. This equation is as follows:

$$DF(dist, x, y) = DeF(DeD(dist, x, y) + \mathrm{DeD\_Shift}(dist, x, y)) \quad \text{Equation 1}$$

Figure 10:
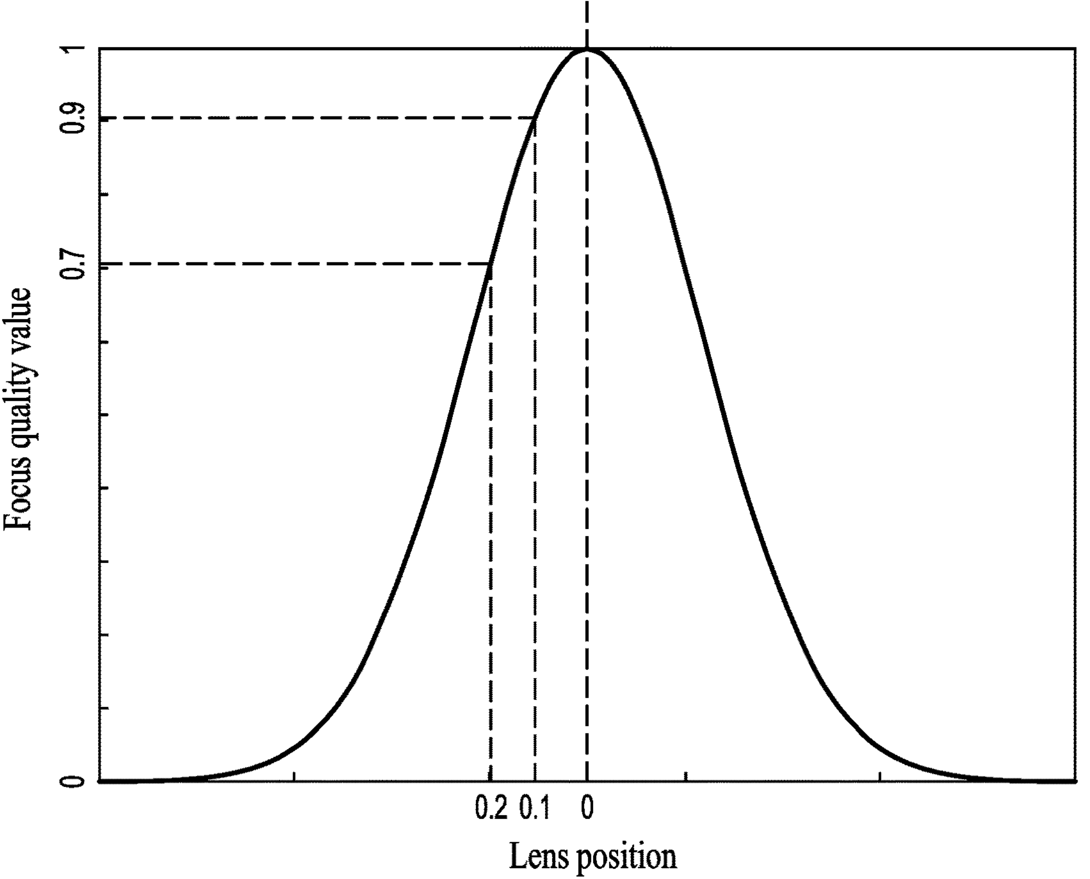
FIG. 10 is a graph of the focus sharpness equation of the projection apparatus of FIG. 1.
Figures 11, 12:
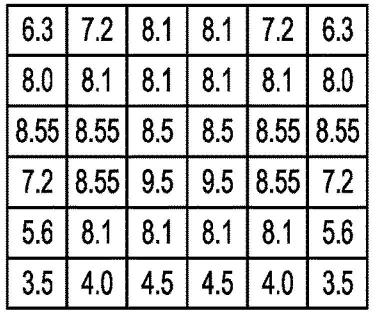
FIG. 11 shows a sharpness matrix of the projection apparatus of FIG. 1.
FIG. 12 illustrates multiplying the standard quality matrix of the projection apparatus of FIG. 1 by the sharpness matrix to obtain the imaging quality matrix.

In FIG. 10, for example, the best focus quality is achieved when the displacement is 0 (i.e., the lens position is 0). After substituting the displacement into DeF, the weakening value of the degree of blur may be obtained, which is the focus quality value on the vertical axis of FIG. 10. When this value is 1, it means the focus quality is the best. When this value is 0, it means the focus quality is very poor. Afterwards, the controller 140 may obtain the sharpness matrix DF(dist, x, y) through the operation of the DeF equation. An example of the sharpness matrix DF(dist, x, y) is shown in FIG. 11. From FIG. 11, it may be seen that the focus is affected by the skew of the projected plane 50.

In this embodiment, the controller 140 is configured to multiply the standard quality matrix BFQT(dist, x, y) of a known projection lens representing the quality performance at each position by the sharpness matrix DF(dist, x, y) to obtain the imaging quality matrix DFQT(dist, x, y) of the projected plane 50, that is:

$$DFQT(dist, x, y) = BFQT(dist, x, y) * DF(dist, x, y) \quad \text{Equation 2}$$

An actual example of Equation 2 is shown in FIG. 12. As the projection provided by the projection apparatus 100 is not a perfect projection, but is clear in the middle and a little blurry on the outside, an equation (i.e., Equation 2) may be applied to obtain the final result. Here, BFQT(dist) is the quality performance of different regions at the dist distance optically from the projection apparatus 100, and DFQT(dist) is the quality perception of the user after the projection apparatus 100 projects onto this projected plane 50 (at a distance of dist).

In this embodiment, the projection apparatus further includes a user interface 150 electrically connected to the controller 140. The controller 140 is configured to adjust the projection range of the image source 110 according to the selection of the user from the user interface 150.

Figure 13:
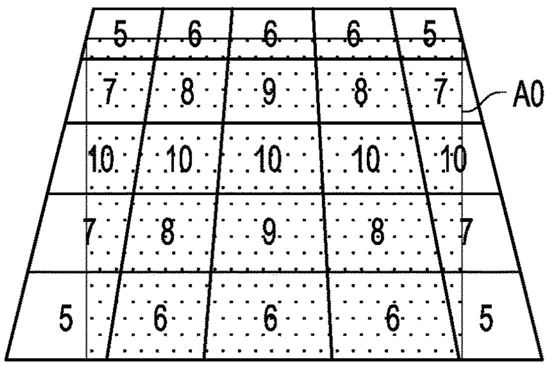
FIG. 13 is the imaging quality matrix of the projection apparatus in FIG. 1 under keystone distortion and the projection range of the conventional technology.
Figure 14A:
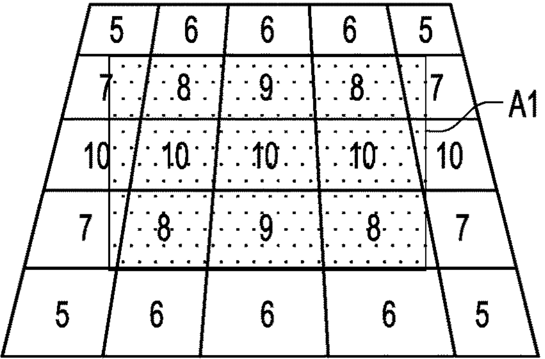
FIG. 14A is the imaging quality matrix of the projection apparatus under keystone distortion and the projection range of an embodiment of the disclosure.

In this embodiment, when the projected image has keystone distortion or the user allows the projection region to be automatically adjusted to avoid obstacles, the projection range may be adjusted, or when it is known from the imaging quality matrix DFQT that the surrounding quality is poor, the projection range may be moved or reduced to meet the focus quality. Generally, the traditional way to improve keystone distortion is to select the largest rectangle in the middle that meets this ratio, such as the projection range A0 in FIG. 13. Of course, this does not take into account whether the focus quality is good, but it is common knowledge for those skilled in the field that when a projector has a skewed projection angle, the image often becomes more blurry at the edges farther away from the center. By utilizing the aforementioned quality evaluation method, we may discern the reason why there is a significant deviation in the DeD values around the periphery when the center quality is at its best (which is caused by the depth of field). In this embodiment, the projection range of the image source 110 may be reduced to a range A1 in which the quality value in the imaging quality matrix is above a threshold (e.g., 6 or other values) by using the controller 140, as shown in FIG. 14A. FIG. 13 is an example of DFQT where the center is adjusted to its optimum (e.g., the quality value of the center is 10) during a slant angle projection. Quality values below 5 in the figure indicate regions where the projection focus is not achieved.

Figure 14B:
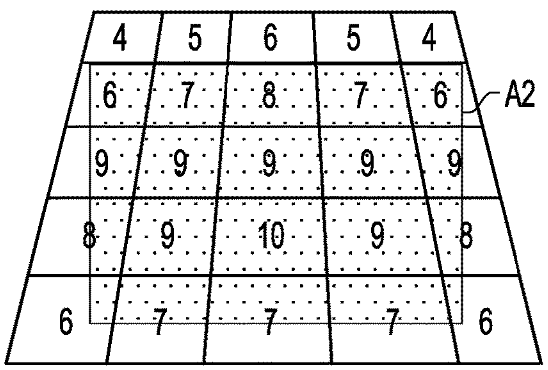
FIG. 14B is the imaging quality matrix of the projection apparatus under keystone distortion and the projection range of another embodiment of the disclosure.

When encountering the situation in FIG. 13, if the projection apparatus 100 has a function that supports displacement or digital reduction, the user may use the user interface 150 to avoid poor peripheral depth of field through manual adjustment. In this embodiment, the controller 140 may use the best DFQT result to automatically help the user narrow the projection range to the range A1 to avoid the effect of poor peripheral depth of field. The result is shown in FIG. 14A, which may be referred to as quality fit. If the user does not care that the middle of the image has the best quality, the controller 140 may also use the DFQT results around OrtD (the range of OrtD–d to OrtD+d) to select a larger but poorer quality projection range A2, as shown in FIG. 14B, which may be referred to as the largest fit. The optimal result of the largest fit is not when the projected plane 50 is orthogonally positioned, but it is when the optimal position of the depth of field of the middle is shifted to the adjacent region, a focus position of a larger acceptable projection range A2 is generated. At this time, the average quality is not the best nor does it have the most optimal regions, but all regions within the projection range A2 have reached a certain level of quality (e.g., the quality value is greater than 6). That is, the focus distance of the projection lens 120 is shifted by the controller 140 to expand the quality values in the imaging quality matrix DFQT to a range above a threshold (e.g., above 6), and the projection range of the image source 110 is reduced by the controller 140 such that the quality values in the imaging quality matrix are in a range A2 above the threshold (e.g., above 6).

In addition, the aforementioned well-focused sampling pixel P is the sampling pixel P with the highest DFQT value when dist is substituted as the range of OrtD−d to OrtD+d in DFQT(dist, x, y). The region where this pixel P is located is the optimal focus region for this segment.

In this embodiment, the controller 140 may be, for example, a central processing unit (CPU), a microprocessor, a digital signal processor (DSP), a programmable controller, a programmable logic device (PLD), or other similar devices, or a combination of these devices, which is not limited in the disclosure. Furthermore, in one embodiment, each of the functions of the controller 140 may be implemented as multiple codes. These codes are stored in a memory, and these codes are executed by the controller 140. Alternatively, in one embodiment, each of the functions of the controller 140 may be implemented as one or more circuits. The disclosure does not limit the implementation of each of the functions of the controller 140 by software or hardware.

In summary, the projection apparatus 100 of this embodiment increases the depth resolution of the ToF ranging sensor 130 by using the method of re-sampling (repeated sampling) the ToF ranging sensor 130, and also propose a set of evaluation methods by using focus analysis. The focus analysis evaluation methods are used to automatically avoid obstacles and improve poor projection focus, such that the ToF ranging sensor 130 greatly increases the functionality and additional values of the projection apparatus 100 without requiring additional equipment (the above operations only require small matrix lookup tables and simple calculations. This operation may be processed by its own system-on-a-chip (SOC) without the need for additional powerful processors) and cost during autofocusing.

As projection apparatuses move into living rooms and entertainment applications, the challenge lies in achieving more flexible and accurate autofocusing. The autofocus method of the ToF ranging sensor 130 of this embodiment provides the following advantages:

1. Low-cost and more accurate autofocus based on ToF ranging.
2. Additional focus analysis method to obtain better focusing effect than a general ToF ranging lookup table.
3. Functions are provided that allow users to intelligently focus and select the projection range.

Figure 15:
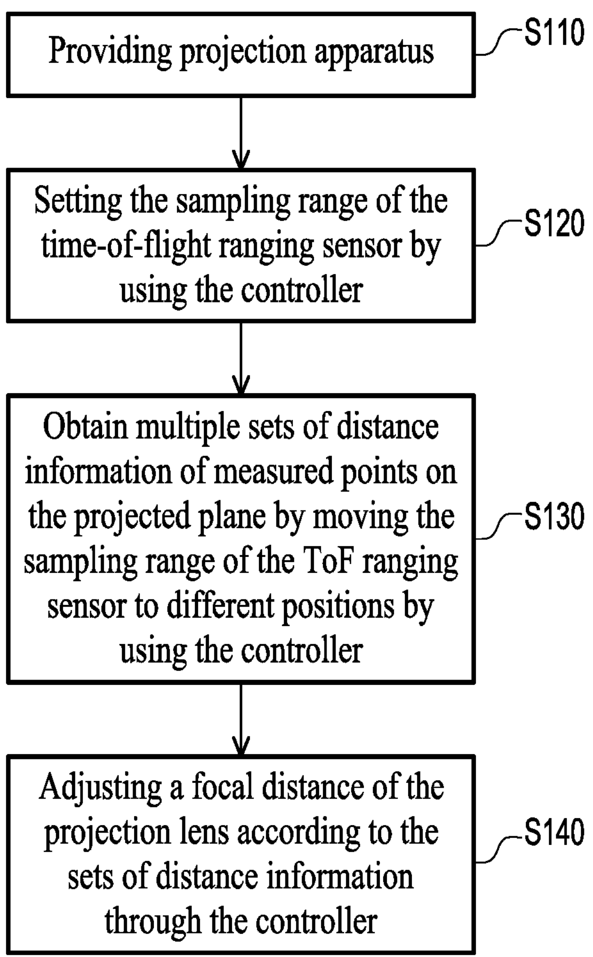
FIG. 15 is a flowchart of a projecting method according to an embodiment of the disclosure.

FIG. 15 is a flowchart of a projecting method according to an embodiment of the disclosure. Referring to FIG. 1 and FIG. 15, the projecting method of this embodiment may be performed by the projection apparatus (e.g., the projection apparatus 100) of the above embodiment, but the disclosure is not limited thereto. The projection apparatus of this embodiment includes the following steps. Firstly, step S110 is executed, a projection apparatus 100 is provided. Next, step S120 is executed, and the sampling range of the ToF ranging sensor 130 is set by using the controller 140. Then, step 130 is executed, multiple sets of distance information of measured points on the projected plane 50 is obtained by moving the sampling range of the ToF ranging sensor 130 to different positions by using the controller 140. Afterwards, step S140 is executed, a focal distance of the projection lens 120 is adjusted according to the sets of distance information through the controller 140. Other detailed steps of the projecting method of this embodiment have been described in detail in the above embodiment of the projection apparatus 100, so please refer to the description of the above embodiment.

Figure 16:
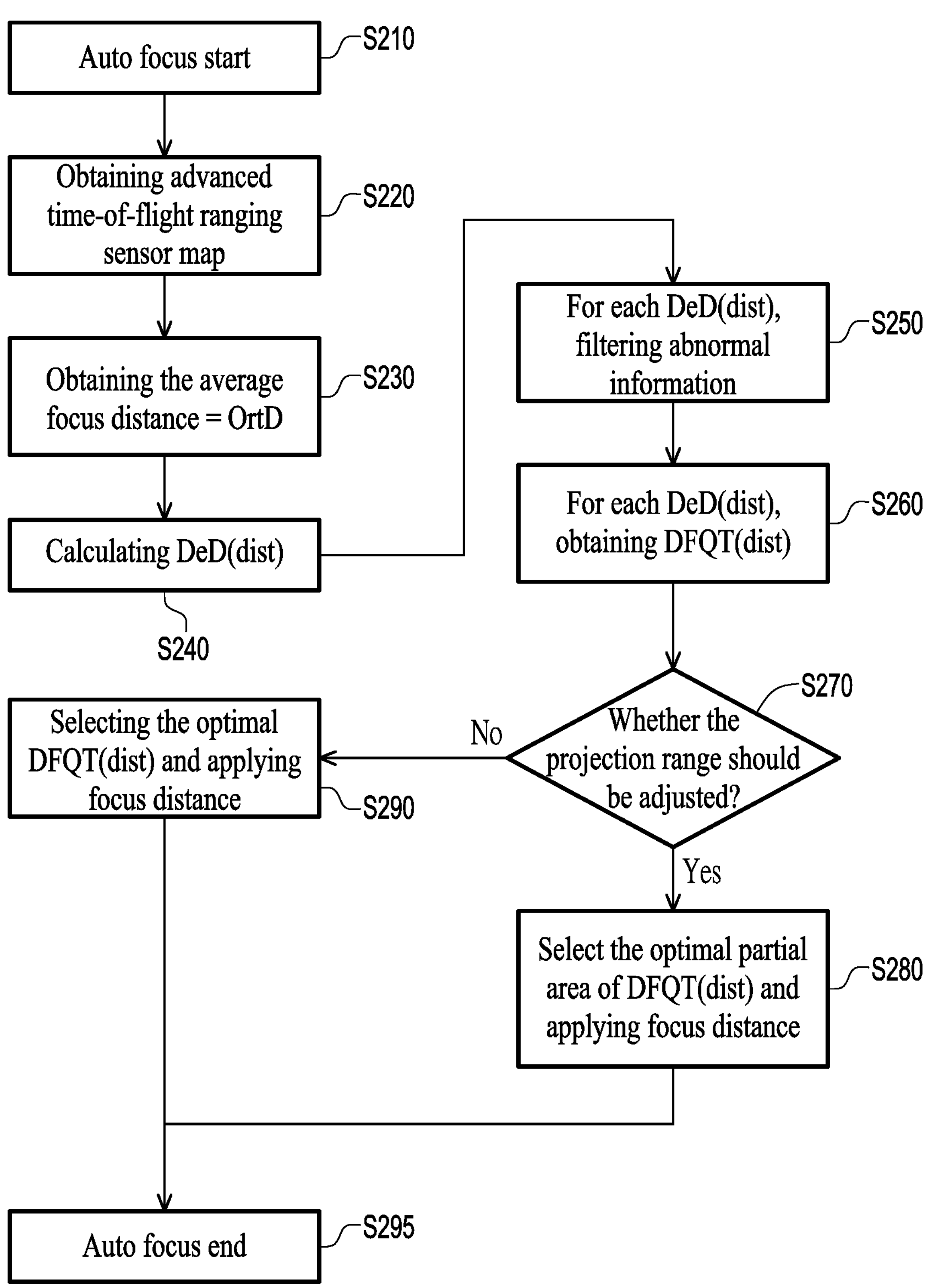
FIG. 16 is an autofocus flowchart of the ToF ranging sensor of the projection apparatus in FIG. 1.

FIG. 16 is an autofocus flowchart of the ToF ranging sensor of the projection apparatus in FIG. 1. Referring to FIG. 1 and FIG. 16, in this embodiment, the autofocus process of the ToF ranging sensor 130 may include the following steps. Firstly, step S210 is executed, which is the start of autofocus. Next, step S220 is executed, an advanced ToF ranging sensor map is shown, which is shown in FIG. 4, for example. Then, step S230 is executed, where the average focus distance is equal to OrtD is obtained, as detailed in the relevant paragraphs of FIG. 5 above. Afterwards, S240 is executed, DeD(dist) is calculated, as detailed in the above embodiment. Thereafter, step S250 is executed, for each DeD(dist), abnormal information is filtered, as detailed in the relevant paragraphs of FIG. 9 above. Afterwards, step S260 is executed, for each DeD(dist), DFQT (dist) is obtained, as detailed in the above embodiment. Next, step S270 is executed, whether the projection range should be adjusted is determined, for example, as shown in FIG. 13, whether the image has keystone distortion is determined, or whether to allow manual adjustment for the user. If adjustment is required, step S280 is executed, the optimal partial region of DFQT(dist) is selected and focus distance is applied, as detailed in the steps of FIG. 14A or FIG. 14B. If no adjustment is required, step S290 is executed, the optimal partial region of DFQT(dist) is selected and focus distance is applied. That is, there is no need to reduce the projection range as shown in FIG. 14A and FIG. 14B, but to project directly. Finally, step S295 is executed, that is, the autofocusing ends.

Figure 17:
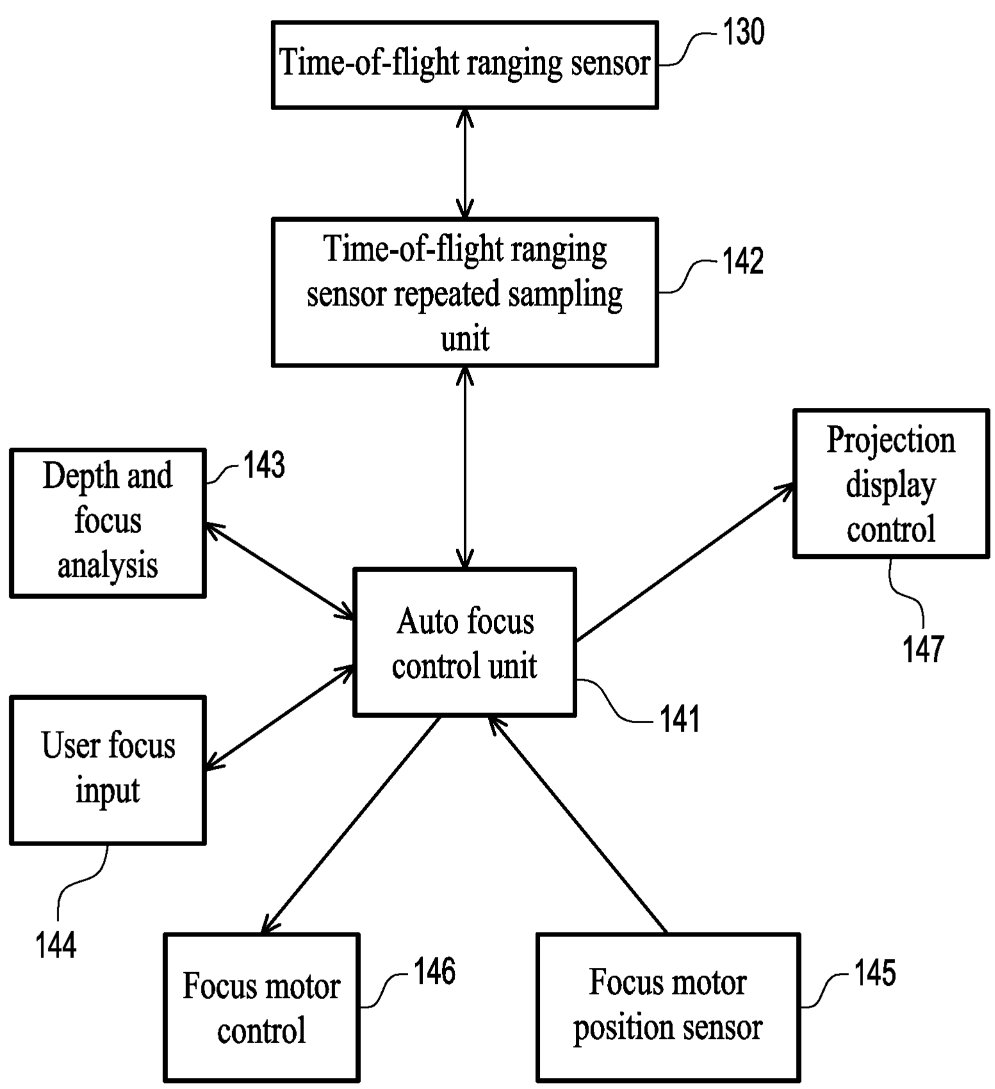
FIG. 17 is a functional block diagram of the projecting method of FIG. 15.

FIG. 17 is a functional block diagram of the projecting method of FIG. 15, which includes a ToF ranging sensor 130, an autofocus control unit 141, a ToF ranging sensor re-sampling unit 142, a depth and focus analysis 143, a user focus input 144, a focus motor position sensor 145, a focus motor control 146, and a projection display control 147. The autofocus control unit 141 reads the value of the ToF ranging sensor 130 and then controls the function of the focus motor control 146 to reach the estimated position of the focus motor position sensor. In addition, in this embodiment, additional functions such as a ToF ranging sensor re-sampling unit 142, a depth and focus analysis 143, a user focus input 144, and a projection display control 147 are added. The ToF ranging sensor re-sampling unit 142 is responsible for obtaining the distance information with improved resolution on the ToF ranging sensor 130, the function of depth and focus analysis 143 is responsible for obtaining the projection quality results after implementing a certain focal distance. The function of user focus input 144 is responsible for accepting the input of the quality requirements of the user and assisting the user to obtain the best projection range (i.e., projection region) when there is keystone distortion or poor projection focus quality. The function of the projection display control 147 is to change the projection range (i.e., the projection region). Each functional block of the aforementioned autofocus control unit 141, ToF ranging sensor resampling unit 142, depth and focus analysis 143, user focus input 144, focus motor position sensor 145, focus motor control 146, and projection display control 147 may be implemented as a module (e.g., a software, hardware, or firmware module).

To sum up, in the projection apparatus and projecting method of the embodiment of the disclosure, since multiple sets of distance information of measured points on the projected plane is obtained by moving the sampling range of the ToF ranging sensor to different positions by using the controller, and a focal distance of the projection lens is adjusted according to the sets of distance information through the controller, the projection apparatus may quickly and accurately autofocus, to project a well-focused image frame.

What is claimed is:

1. A projection apparatus, configured to project an image frame onto a projected plane, the projection apparatus comprising:

an image source, configured to emit an image beam;

a projection lens, disposed on a light path of the image beam, and configured to project the image beam onto the projected plane to form the image frame;

a time-of-flight (ToF) ranging sensor, configured to measure a distance from the projected plane; and a controller, electrically connected to the ToF ranging sensor and the projection lens, wherein the controller is configured to set a sampling range of the ToF ranging sensor, obtain a plurality of sets of distance information of measured points on the projected plane by moving the sampling range of the ToF ranging sensor to different positions, and adjust a focal distance of the projection lens according to the sets of distance information through the controller, wherein setting the sampling range of the ToF ranging sensor comprises respectively setting a plurality types of sampling windows of the ToF ranging sensor, and the controller is configured to obtain the sets of distance information by respectively moving the plurality types of sampling windows to different positions, wherein the plurality types of sampling windows have different sizes or coverage ranges of a plurality of sampling pixels of the multiple types of sampling windows are different.

2. The projection apparatus according to claim 1, wherein the controller is configured to interpolate the sets of distance information, and the controller is configured to adjust the focal distance of the projection lens according to the interpolated sets of distance information.

3. The projection apparatus according to claim 1, wherein the controller is configured to calculate a difference matrix between a distance value measured by each sampling pixel in the sampling range and a distance value measured by a well-focused sampling pixel in the sampling range.

4. The projection apparatus according to claim 3, wherein the controller removes abnormal information in the difference matrix and calculates an average distance of the projected plane.

5. The projection apparatus according to claim 4, wherein the controller is configured to add the difference matrix to a known focal distance offset matrix of the projection lens that represents an offset state of focal distance at each position.

6. The projection apparatus according to claim 5, wherein the controller is configured to substitute a result of adding the difference matrix and the focal distance offset matrix into a focus sharpness equation to obtain a sharpness matrix, and the controller is configured to multiply a known standard quality matrix representing quality performance at each position of the projection lens by the sharpness matrix to obtain an imaging quality matrix of the projected plane.

7. The projection apparatus according to claim 6, further comprising a user interface, electrically connected to the controller, wherein the controller is configured to adjust a projection range of the image source according to a selection of a user from the user interface.

8. A projecting method, comprising:

providing a projection apparatus, wherein the projection apparatus comprises an image source, a projection lens, and a time-of-flight (ToF) ranging sensor, the image source is configured to emit an image beam, the projection lens is disposed on a light path of the image beam, and is configured to project the image beam onto a projected plane to form an image frame, the ToF ranging sensor is configured to measure a distance from the projected plane;

setting a sampling range of the ToF ranging sensor by using a controller;

obtaining a plurality of sets of distance information of measured points on the projected plane by moving the sampling range of the ToF ranging sensor to different positions by using the controller; and adjusting a focal distance of the projection lens according to the sets of distance information through the controller, wherein setting the sampling range of the ToF ranging sensor comprises respectively setting a plurality types of sampling windows of the ToF ranging sensor, and moving the sampling range of the ToF ranging sensor to different positions comprises obtaining the sets of distance information by respectively moving the plurality types of sampling windows to different positions by using the controller, wherein the plurality types of sampling windows have different sizes or coverage ranges of a plurality of sampling pixels of the multiple types of sampling windows are different.

9. The projecting method according to claim 8, further comprising:

interpolating the sets of distance information by using the controller; and adjusting the focal distance of the projection lens according to the interpolated sets of distance information by using the controller.

10. The projecting method according to claim 8, further comprising calculating a difference matrix between a distance value measured by each sampling pixel in the sampling range and a distance value measured by a well-focused sampling pixel in the sampling range by using the controller.

11. The projecting method according to claim 10, further comprising:

removing abnormal information in the difference matrix by using the controller; and calculating an average distance of the projected plane by using the controller.

12. The projecting method according to claim 11, further comprising adding the difference matrix to a known focal distance offset matrix of the projection lens that represents an offset state of focal distance at each position by using the controller.

13. The projecting method according to claim 12, further comprising:

substituting a result of adding the difference matrix and the focal distance offset matrix into a focus sharpness equation by using the controller to obtain a sharpness matrix; and multiplying a known standard quality matrix representing quality performance at each position of the projection lens by the sharpness matrix by using the controller to obtain an imaging quality matrix of the projected plane.

14. The projecting method according to claim 13, further comprising reducing a projection range of the image source by using the controller such that quality values in the imaging quality matrix are in a range above a threshold.

15. The projecting method according to claim 13, further comprising:

shifting focus distance of the projection lens by using the controller to expand quality values in the imaging quality matrix to a range above a threshold; and reducing a projection range of the image source by using the controller such that the quality values in the imaging quality matrix are in a range above the threshold.

16. The projecting method according to claim 13, wherein the projection apparatus further comprises a user interface, electrically connected to the controller, the projecting method further comprises adjusting a projection range of the image source according to a selection of a user from the user interface by using the controller.

* * * * *